United States Patent [19]
Brown

[11] Patent Number: 5,499,167
[45] Date of Patent: Mar. 12, 1996

[54] SPOTLIGHT UNIT FOR USE ON A VEHICLE

[76] Inventor: Fred G. Brown, Box 1002, Pampa, Tex. 79066

[21] Appl. No.: 371,207

[22] Filed: Jan. 11, 1995

[51] Int. Cl.6 ..................................... F21V 21/30
[52] U.S. Cl. ............................... 362/35; 362/66
[58] Field of Search ........................... 362/35, 66

[56] References Cited

U.S. PATENT DOCUMENTS 3,963,940  6/1976  Adamiah .................... 307/10 LS
4,353,110  10/1982 Ellis ............................ 362/66
4,981,363  1/1991  Lipman ........................ 362/68
5,034,860  7/1991  Bryant .......................... 362/70

Primary Examiner—Carroll B. Dority
Attorney, Agent, or Firm—Terry M. Gernstein

[57] ABSTRACT

A spotlight is contained in a housing that is releasably mountable on the surface of a vehicle. The spotlight is movable in 360° in two planes, and is connected to a power source by a joystick-like switch so the light can be moved in any suitable direction by a person located anywhere inside the vehicle. The spotlight can be located in any suitable position on the vehicle.

4 Claims, 3 Drawing Sheets 6,499,167

SPOTLIGHT UNIT FOR USE ON A VEHICLE

TECHNICAL FIELD OF THE INVENTION

The present invention relates to the general art of vehicle accessories, and to the particular field of spotlights.

BACKGROUND OF THE INVENTION

Many vehicles, such as emergency vehicles or police vehicles, are equipped with spotlights. The spotlights are often mounted on the top or side of the vehicle and are controlled by the vehicle operator from inside the vehicle. The operator turns on a switch and then orients the spotlight using a handle that is mechanically connected to the spotlight. The art contains several examples of this type of spotlight.

While these spotlights work well, they have certain disadvantages, which this invention addresses. For example, when not in use, the present spotlights are still mounted outside the vehicle and can represent a target for vandals or can even be a hazard. Still further, the permanent mounting of these spotlights requires special manufacturing steps and makes retrofitting of a vehicle difficult and expensive.

Still further, the permanent mounting of these spotlights restricts their use by requiring the vehicle to be positioned so the spotlight can be operated. Thus, if the spotlight is located on the driver's side of the vehicle, the vehicle must be oriented so the vehicle is not located between the spotlight and the object to be illuminated. This restricts the use of the vehicle and the spotlight. Further, in a permanently mounted spotlight, only the driver or the front seat passenger can operate the spotlight. This may not be the most efficient way to use the spotlight. Perhaps someone in the back seat of the vehicle is better able to operate the spotlight while the driver and the front seat passenger concentrate on other things. A permanently mounted spotlight prevents this freedom.

Therefore, there is a need for a spotlight unit that can be easily mounted anywhere on a motor vehicle, yet can be easily removed from the motor vehicle and can be accurately and easily controlled from anywhere within the motor vehicle.

OBJECTS OF THE INVENTION

It is a main object of the present invention to provide a spotlight unit for use on a motor vehicle, such as a land vehicle, which can be easily mounted on the vehicle and easily removed from the vehicle.

It is another object of the present invention to provide a spotlight unit for a vehicle that can be easily and accurately controlled from within the vehicle.

SUMMARY OF THE INVENTION

These, and other, objects are achieved by a spotlight unit that includes magnets for releasably mounting the unit on a motor vehicle, and which further includes means for remotely operating the spotlight unit.

Specifically, the spotlight unit includes a spotlight that can be moved 360° in a horizontal plane and 360° in a vertical plane using a joystick type control. The unit is electrically connected to the vehicle power system using releasable clamps, such as alligator clamps.

In this manner, the unit can be stored inside the vehicle when not in use, and quickly attached to the vehicle in the most efficient location for use. The unit can then be controlled by an operator located anywhere inside the vehicle.

BRIEF DESCRIPTION OF THE DRAWING FIGURES

DETAILED DESCRIPTION OF THE PREFERRED EMBODIMENT OF THE INVENTION

Figure 1:
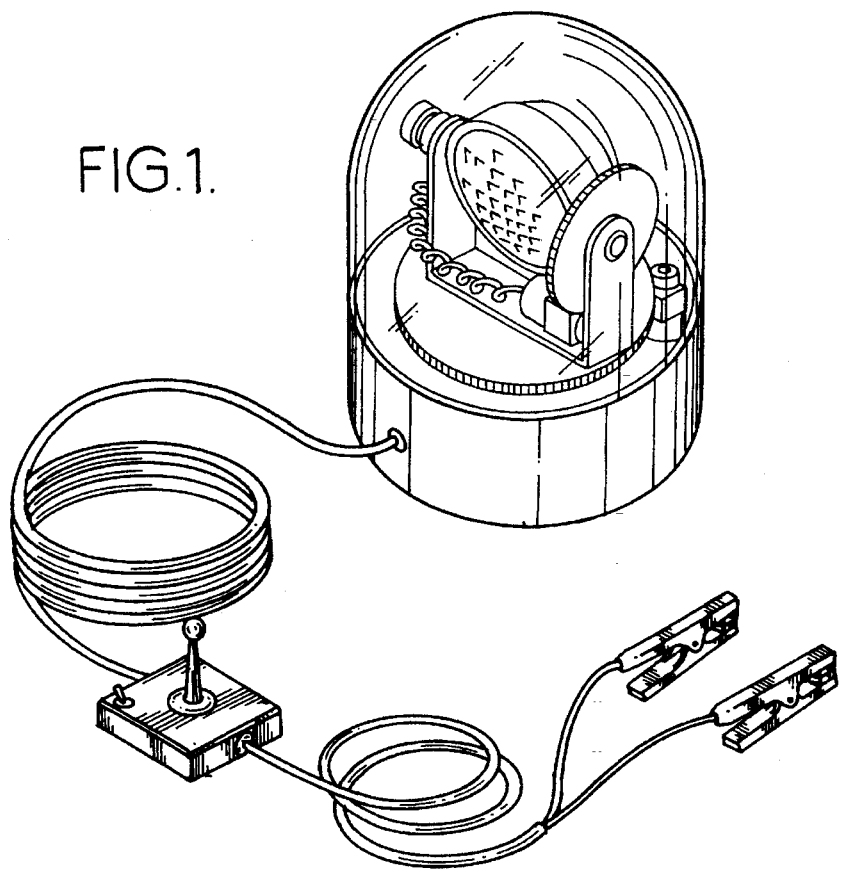
FIG. 1 is a perspective view of a spotlight unit embodying the present invention.

Shown in FIG. 1 is a spotlight unit 10 that includes a base housing 12 that rests on a surface of the vehicle, such as the vehicle roof or its hood, or the like in a manner that will permit the unit to be removed when not in use. A transparent cover 14 rests on housing 12. The overall unit 10 includes a spotlight 16 that can be moved 360° in a horizontal plane as indicated by double-headed arrow 18 and 360° in a vertical plane as indicated by double-headed arrow 20. Spotlight 16 is activated by being connected to a source of power (not shown) associated with the vehicle, such as the vehicle electrical system, via a control unit 22 that connects the spotlight and the elements associated therewith to the source of power by first lead means 24 and second lead means 26, with clamps, such as alligator clamps 28, being connected to first lead means 24.

Figure 3:
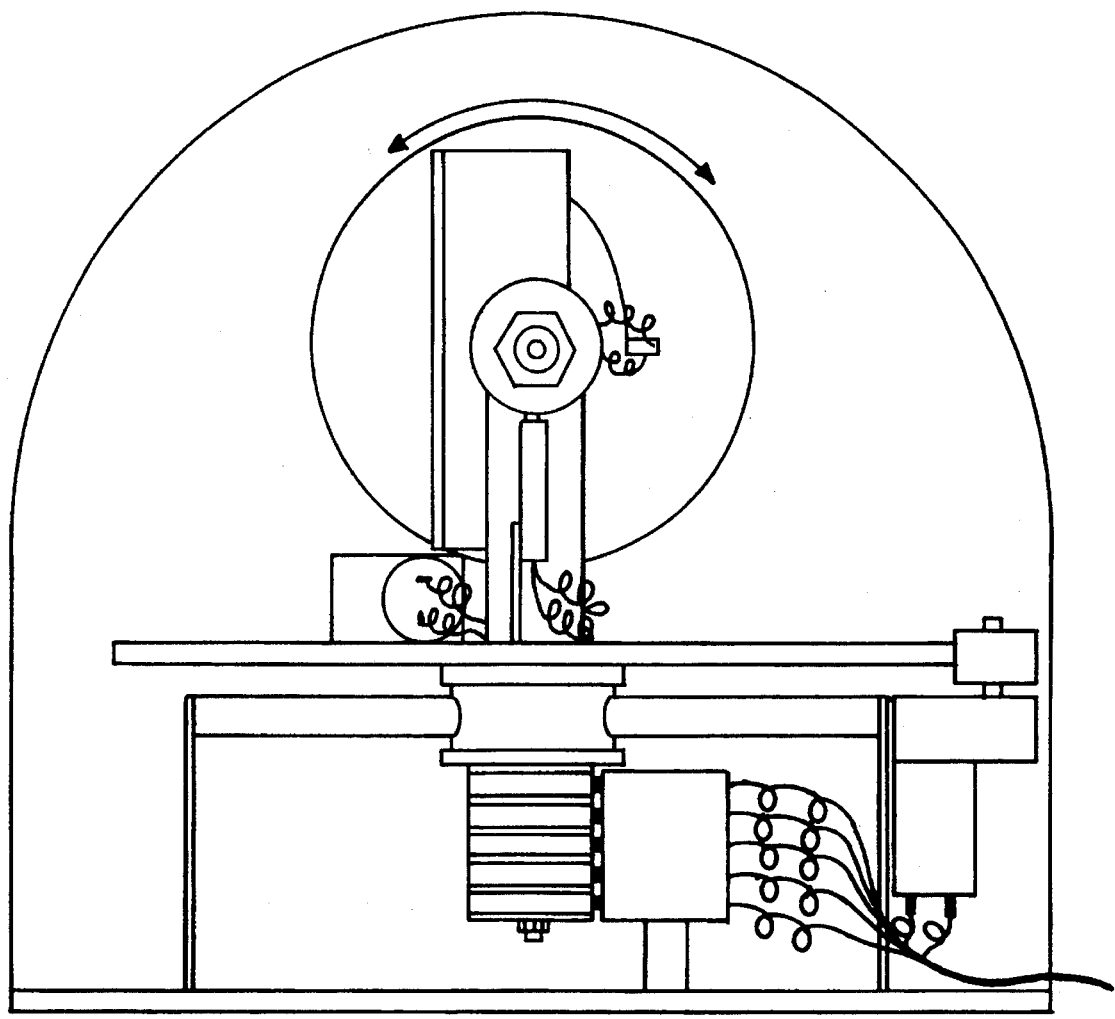
FIG. 3 is a cutaway side elevational view of the spotlight unit.

Base housing 12 is best shown in FIGS. 1 and 3. Housing 12 is cylindrical and includes an outer wall 30, surrounding an inner support wall 32, with a bottom 34 releasably closing the bottom of the housing. A means 36 for releasably holding unit 10 in position on a vehicle is included in housing 12, and can include a magnet or suction means or the like on the bottom 34. An element 38 is mounted on inner wall 32.

The spotlight receives power via a horizontal commutator 40 supported on element 38 and receiving power from brushes 42 mounted on a brush holder 44 and contacting rings 46. Rings 46 are electrically connected to the spotlight by leads 50, and the brush holder is mounted on a pedestal 52 attached to a base 34. Rings 46 are separated by isolation spacers, such as spacer 56.

Figure 2:
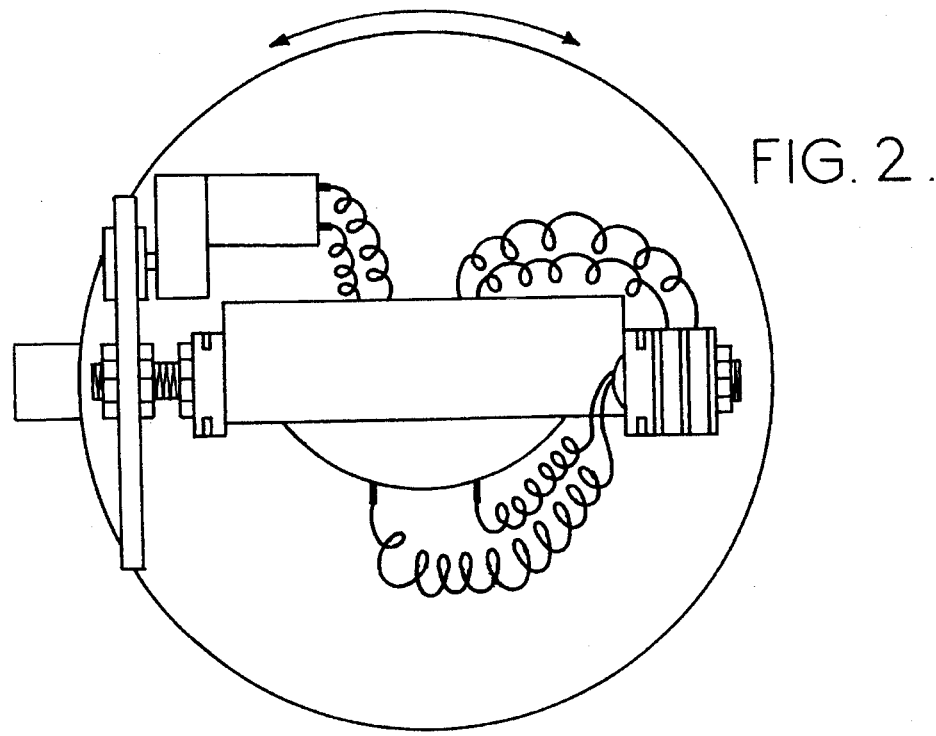
FIG. 2 is a top plan view of the spotlight unit.

As is broadly shown in FIGS. 2 and 3, spotlight 16 is moved by a light moving unit that includes a first motor 60 mounted on inner support wall 32 and connected to lead means 26 by leads 92, and a second motor 64 connected to lead means 26 by leads 64. The spotlight is mounted on element 38 by a light mounting unit that includes a first base 66 mounted on commutator 40 by a swivel bracket 66 and which includes an outer peripheral edge 68 engaging a drive 72 that is connected to motor 60 by a gear system 74. When motor 60 is powered in one direction, base 66 is rotated on one direction and when motor 60 is powered in the opposite manner, base 66 is rotated in the opposite direction.

Spotlight 16 is mounted in a yoke 80 which includes two short legs 82 connected to a bight 84 that is mounted on first base 66. Spotlight 16 is moved in directions 20 by second motor 64 connected to a drive disc 86 having a peripheral edge 88 engaging a drive gear 90 connected to second motor 64 which is electrically connected to the power source via leads 92 that are connected to brushes 42. When power is applied to the brushes in one direction, motor 64 drives spotlight 16 in one direction, and when power is applied to the brushes in another direction, motor 64 drives spotlight 16 in the opposite direction.

Figure 4:
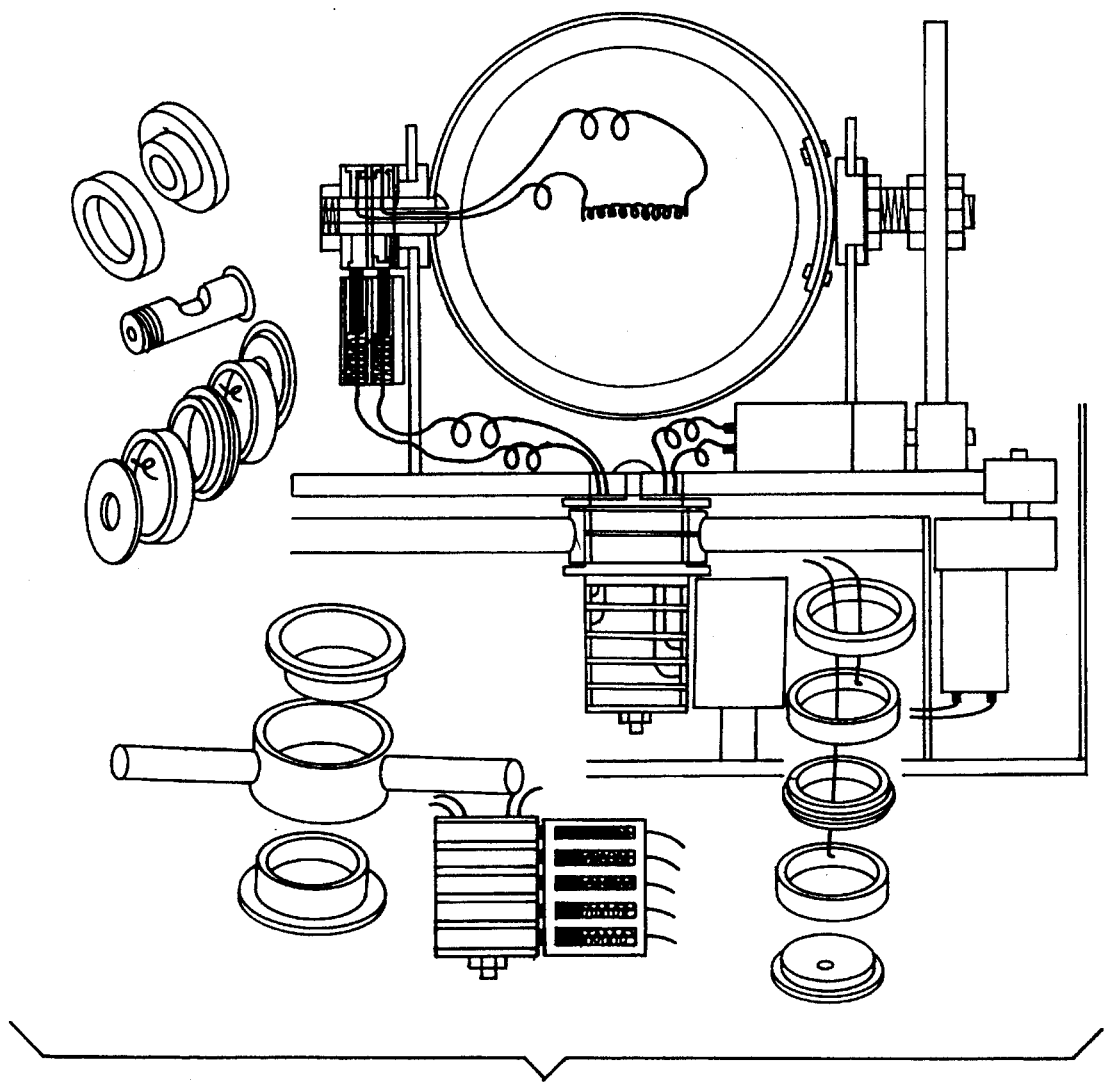
FIG. 4 is an exploded perspective view of the spotlight unit showing all of the various elements of the unit.

As shown in FIG. 4, element 38 is cylindrical and is attached to a ring 100 that is capped by bushings 102, with a fastener 106 attaching the element 38 to disk 66. As is also shown in FIG. 4, power to spotlight 16 is provided via leads 50 and unit 110, which includes connector rings 112 separated by spacers 114 mounted on leg 82. Teflon bushings 114 attach spotlight 16 to the legs 80 and 82 via bolts 116.

Spotlight 16 is controlled by control unit 22 which is similar to a joystick. Unit 22 includes a body 120 and a control stick 122 mounted on the body to move in four directions 124–130 to move the spotlight in directions 18 and 20 as above discussed. An on/off switch 132 is also included for turning the unit on and off. Unit 22 electrically connects the spotlight and control motors to the power source via leads 24 and 26. The details of unit 22 will not be discussed because these details are not part of the present invention and are known to those skilled in the art based on the teaching of this disclosure.

It is understood that while certain forms of the present invention have been illustrated and described herein, it is not to be limited to the specific forms or arrangements of parts described and shown.

I claim:

1. A spotlight unit for use on a vehicle comprising:
   A) a housing unit which includes
      (1) a base housing having a bottom surface,
      (2) means on said bottom surface for releasably mounting said base unit on an outer surface of a vehicle,
      (3) a support wall located in said base housing, and
      (4) a transparent cover mounted on said base housing;
   B) a control unit which comprises
      (1) a body,
      (2) an on/off switch on said body,
      (3) a control stick movably mounted on said body for movement in four directions,
      (4) first lead means for connecting said control unit to a source of power, and
      (5) second lead means for connecting said control unit to said housing unit;
   C) a light mounting unit which includes
      (1) a first motor mounted on said support wall inside said base housing and connected to said second lead means,
      (2) a second motor mounted on said support wall in said cover and connected to said second lead means,
      (3) a first base mounted on said support wall in said housing unit for rotation in 360° degrees in a first plane,
      (4) a drive disc mounted on said support wall in said housing unit for rotation in 360° degrees in a second plane,
      (5) first means for connecting said first motor to said first base to rotate said first base when said first motor is activated, and
      (6) second means for connecting said second motor to said drive disc for rotating said drive disc in said second plane when said second motor is activated;
   D) a pedestal unit in said cover which includes a yoke having a bight section mounted on said first base and two short legs on said bight section, said drive disc being mounted on one short leg;
   E) a spotlight mounted on said pedestal unit; and
   G) lead means for connecting said spotlight to said control unit.

2. The spotlight unit defined in claim 1 further including electrical clips on said first lead means.

3. The spotlight unit defined in claim 2 further including a gear system for each of said first and second motors.

4. The spotlight unit defined in claim 1 further including a commutator unit on said support wall.

* * * * *